Figure 1:
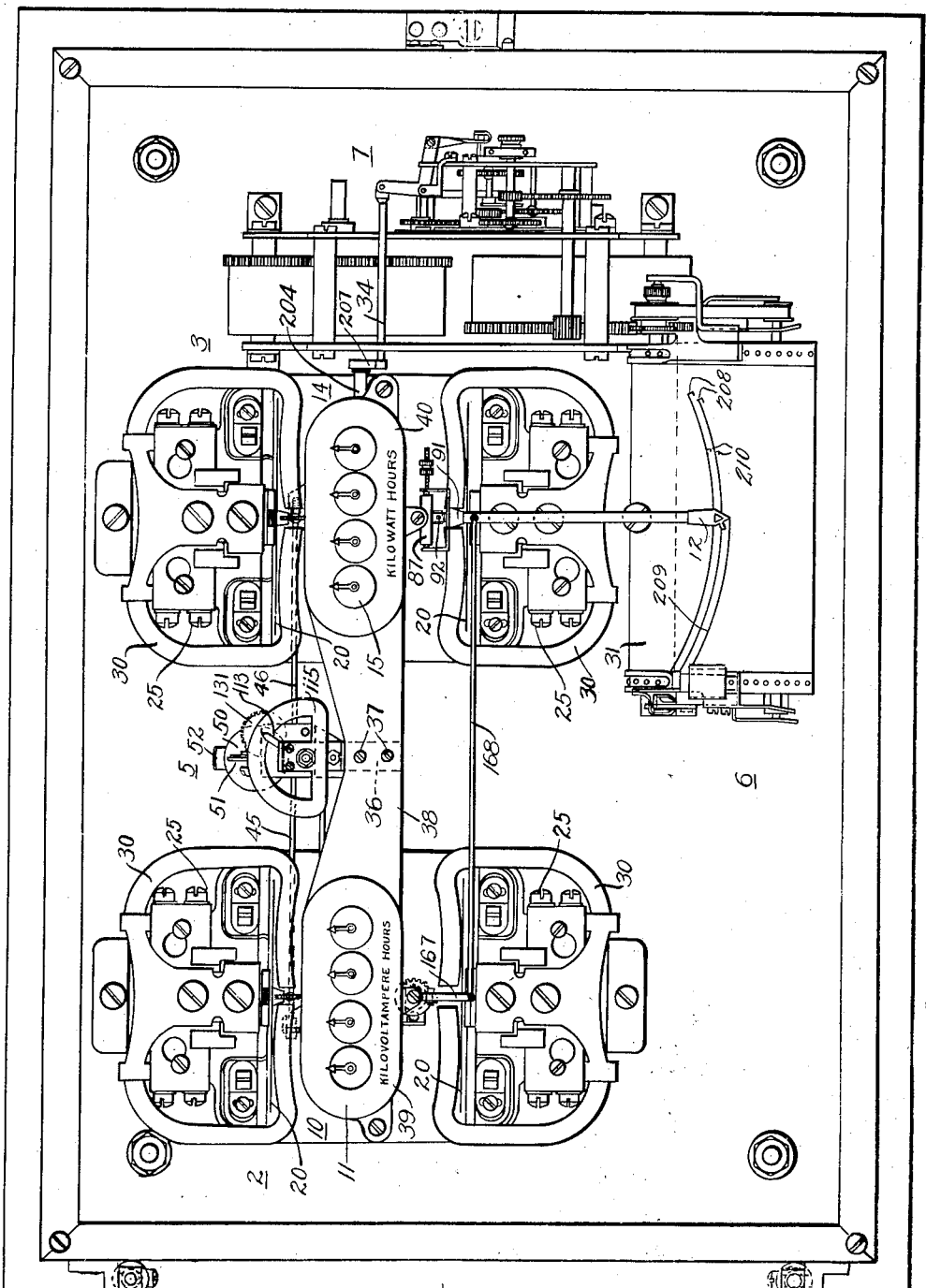

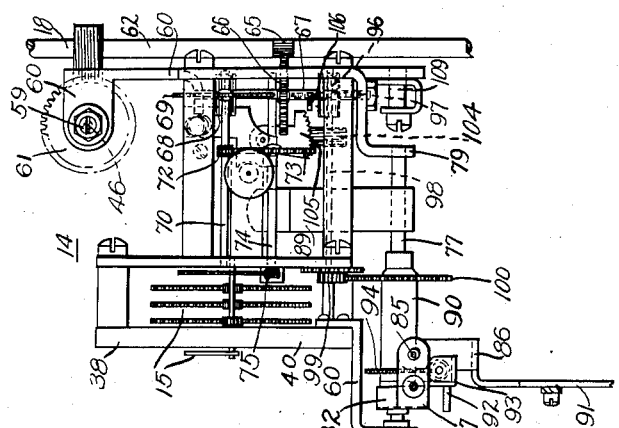

Patented May 6, 1930

1,757,597

UNITED STATES PATENT OFFICE

BENJAMIN H. SMITH, OF SWISSVALE, PENNSYLVANIA, ASSIGNOR TO WESTINGHOUSE ELECTRIC & MANUFACTURING COMPANY, A CORPORATION OF PENNSYLVANIA

MEASURING INSTRUMENT

Application filed January 2, 1924. Serial No. 683,964.

My invention relates to measuring instruments and particularly to instruments for measuring alternating-current-circuit quantities.

One object of my invention is to provide a measuring instrument of the above indicated character that shall indicate, at a single general location, the values and relation of a plurality of correlated quantities.

Another object of my invention is to provide an instrument of relatively simple mechanical form that shall effectively indicate a plurality of alternating-current-circuit quantities, one at least of which has heretofore only been obtainable by the use of relatively complicated and ineffective apparatus and by computation from a plurality of instrument readings.

Another object of my invention is to provide a graphic meter that shall effect a single record mark or curve from which the values of a plurality of correlated quantities may be obtained or that shall, in effect, inscribe a composite curve comprising a plurality of superimposed curves representing values of different quanties.

Another object of my invention is to provide a volt-ampere-hour attachment for cooperation with a watt-hour and a reactive-volt-ampere-hour meter that is, at all times, directly connected to one of the meters, in contradistinction to a similar attachment or device that requires a reversing clutch or similar mechanism to compensate for the difference in the direction of rotation of the reactive volt-ampere-hour meter.

Another object of my invention is to provide an instrument for effecting a plurality of indications that shall comprise a plurality of movable members that are adapted to be reset to initial position in predetermined order or sequence.

Another object of my invention is to provide a graphic meter that shall be effective to record the periodic time integrated demands of the apparent and actual energy of an alternating-current circuit in time-phase relation on the same chart.

A further object of my invention is to provide an electrical measuring instrument by the use of which all of the factors incident to an inductive alternating-current-circuit load may be quickly obtained and that shall be readily adapted to a commercial unit.

In commercial alternating-current systems, the problem of providing a tariff that is equitable for both the consumer and the producer has been complicated by various factors. One of these factors is the relation of the useful energy taken by the consumer to the cost of supplying that energy by the producer.

In alternating-current circuits, losses by inductance and capacitance cause the apparent energy or volt-amperes to be greater than the actual useful energy or watts used by the consumer.

It has been usual to base the tariff charges for electrical energy in accordance with the watt-hour consumption and actual energy demand, chiefly because instruments for measuring the volt-ampere-hour consumption and apparent-energy demand have not been perfected in a practical, effective and commercial form.

To compute the latter quantities from the readings of other instruments, such as power-factor meters, reactive-volt-ampere meters and watt meters, entails an excessive amount of labor and it is naturally to be desired that instruments for directly determining the desired data be provided.

Many attempts have been made to provide volt-ampere and volt-ampere hour meters for alternating-current circuits, but by reason of the difficulty of resolving the peculiar relations of the various circuit factors into compact commercial mechanical movements or devices, none of these attempts have, to the best of my knowledge, resulted in the production of instruments that have been extensively adopted or recognized as standard apparatus.

It is my aim to overcome all of the difficulties of the prior art, relative to the provision of means for determining the volt-ampere-hour consumption and periodic demand, as well as other related quantities by providing an instrument substantially as simple and rugged in construction and effective in operation as many of the well-known standard watt-hour and demand meters.

In practicing my invention, I provide a translating mechanism that is operated by a reactive-volt-ampere-hour meter and a watt-hour meter in accordance with the volt-ampere hours of a circuit. A single movable indicating or recording element is operated by the translating mechanism to move in advance of an element that is moved by the watt-hour meter. At the end of a predetermined time interval, a resetting mechanism releases the recording element from the translating device to return the element to an initial or zero position During the movement of the recording element to said initial position, it engages a portion of the watt-hour meter element, above mentioned, to effect a record of the integrated energy demand for a given period Thus, a composite record showing the integrated periodic demands of both the apparent and actual energy, is effected.

Figure 2:
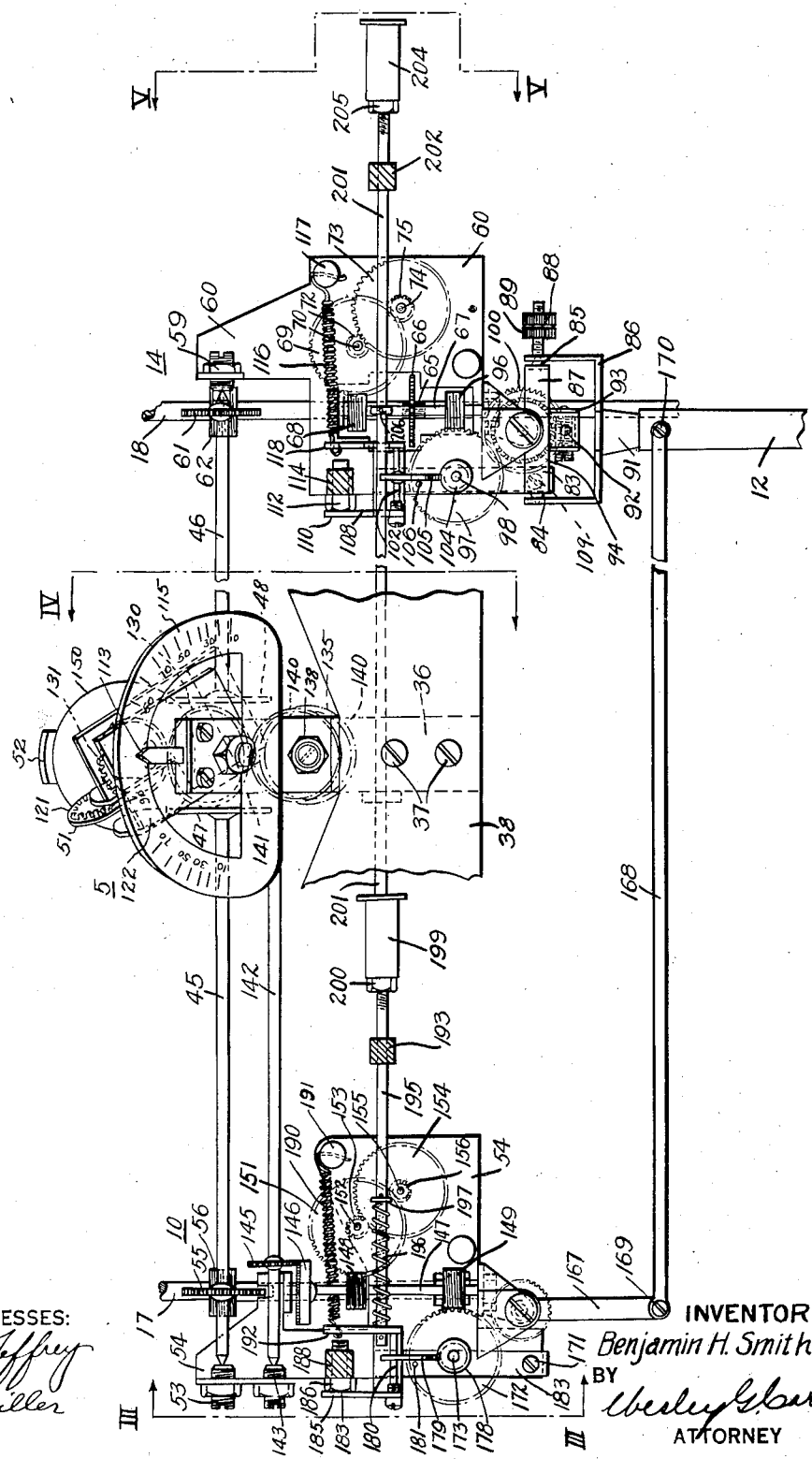

Figure 1 of the accompanying drawings, is a front elevational view of an instrument constructed in accordance with my invention, Fig. 2 is an enlarged detail view of a portion of the device shown in Fig. 1, with parts broken away for clearness, and Figs. 3, 4 and 5 are detail views of parts of the mechanism shown in Fig. 2, taken along the lines III—III, IV—IV and V—V, respectively.

The instrument comprises, in general, a supporting panel or casing 1 by which are supported a reactive-volt-ampere-hour meter 2, a watt-hour meter 3, a translating device 5, a graphic-chart device 6, and a clock or time-operated mechanism 7.

A unit mechanism 10, (Figs. 2 and 3) for co-operation with the translating device 5, a volt-ampere-hour integrating mechanism 11 and a recording element or stylus 12, is associated with the reactive-volt-ampere-hour meter 2.

A unit mechanism 14 (Figs. 2 and 5) for co-operation with the translating device 5, a watt-hour integrating mechanism 15 and the recording stylus 12, is associated with the watt-hour meter 3.

The meters 2 and 3 are similar to a usual form of integrating meter, well known in the art, and do not necessitate detailed description beyond the fact that they embody shafts 17 and 18, respectively, carrying armature disks 20 that are operated by electromagnet structures 25 and controlled by damping magnets 30

The chart device 6 and the clock mechanism 7 are also old in the art and do not necessitate description beyond the statement that the mechanism 7 periodically, such as at fifteen minute intervals, advances a chart 31 upwardly a relatively slight distance and moves a rod 34 longitudinally to the left, as viewed in Fig. 1.

The translating device 5, as more clearly shown in Figs. 2 and 4, is constructed similar to, and operates in accordance with the principle of, a mechanism for integrating power-current values invented by F. R. Innes and set forth in United States Patent No. 1,256,234, issued Feb. 12, 1918.

As embodied in my invention, the device 5 is supported on a bracket 36 mounted, as by screws 37, on a bridge member or plate 38 that extends between the integrating mechanisms 11 and 15, and constitutes, at its ends 39 and 40, supporting plate portions for the integrating mechanisms 11 and 15, respectively. Axially alined shafts 45 and 46 journaled, near their adjacent ends, in the bracket 36, are provided. at their adjacent ends, with disks or wheels 47 and 48, respectively, that are axially spaced from each other and engage a spherical body or ball 50 in tangential or peripheral contact therewith at points substantially ninety degrees from each other relative to the center of the ball 50. The latter is supported at three points only, two of which are on the disks 47 and 48 and the third of which is on a disk wheel 51 and is prevented from displacement by a guard member 52 that is mounted on the bracket 36.

The shaft 45 is journaled, at its outer end, in a bearing 53 that is supported in a frame 54, constituting a portion of the unit mechanism 10, and is provided, adjacent to its outer end, with a worm wheel 55 that engages a worm screw 56 on the shaft 17 of the meter 2.

The shaft 46 is journaled, at its outer end, in a bearing 59 that is supported in a frame 60. constituting a portion of the unit mechanism 14, and is provided adjacent to its outer end, with a worm wheel 61 that engages a worm screw 62 on the shaft 18 of the meter 3.

Motion is transmitted directly from the shaft 18 of the watt-hour meter 3 to the integrating mechanism 15 by a worm-screw portion 65 that engages a worm wheel 66 mounted on a shaft 67. A worm screw 68 on the shaft 67 engages a worm-gear 69 on a shaft 70 that carries a pinion 72. The latter engages a gear wheel 73 on a shaft 74 that carries a pinion 75 for operating the gear train of the integrating mechanism 15.

A shaft 77, journaled in bearings 78 and 79 that are supported by the frame 60 of the unit structure 14, carries a sleeve 82 rigidly secured thereto. The sleeve 82 is provided with lateral projections 83 and 87 carrying pins or trunnions 84 and 85, respectively, which pivotally support a yoke member 86 having a depending portion 91 to which the stylus 12 is secured. Weight members 88 and 89 are carried by the trunnion 85 and the shaft 77, respectively, to balance the weight of the stylus 12.

A sleeve 90, loosely mounted on the shaft 77, carries a pin 92 that is rigidly connected to the sleeve 90 by an arm 93, and a zero-setting worm and gear train 94.

The pin 92 and the projection 87 are adapted to travel in the same plane and to engage each other for a purpose to be hereinafter more fully described.

Motion is transmitted from the shaft 18 of the watt-hour meter 3 to the pin 92 by a worm screw 96, on the shaft 67, that engages a worm wheel 97 on a shaft 98. The latter is connected to the sleeve 90 through a gear-reduction train 99 including a gear wheel 100 on the sleeve 90.

The shaft 98 also carries a worm screw 104 for engagement with a segmental gear member 105 that is mounted on a shaft 102 and is adapted to engage a pin 106 on the worm wheel 97. The shaft 98 of the worm wheel 97 is journaled at one end, and the shaft 102 of the segmental gear member 105 is mounted, in a bracket 108 that is pivotally mounted, by a pin 109, on the frame 60. An upwardly projecting portion 110 of the bracket 108 engages an adjustable screw 112 in a cross member 114 of the frame 60. A spring 116, extending between a pin 117 on the frame 60 and an upwardly projecting portion 118 of the bracket 108, normally holds the projection 110 against the adjusting screw 112, with the worm wheel 97 in engagement with the work screw 96.

In the apparatus, as so far described, the connection of the watt-hour meter shaft 18 to the translating device 5, to the pin 92 and to the integrating mechanism 15, and the connection of the reactive volt-ampere-hour meter shaft 17 to the translating device 5, have been fully set forth.

It remains to be shown how the translating device 5 operates the integrating mechanism 11 and the stylus 12, in accordance with the volt-ampere hours, and how the pin 92 and the stylus 12 co-operate and are reset.

In the translating device 5, the disk 51 is mounted on shaft 120, see Fig. 4, that carries a crown gear wheel 121 and is journaled in a frame structure 122. A pointer 113 rigidly secured to the frame 122 to move therewith co-operates with a scale 115 that is mounted on the bracket 36. The frame structure 122 is pivotally mounted, about a diagonal axis of the ball 50, on trunnion shafts 124 and 125 journaled in bearings 126 and 127 that are supported in arms 128 and 129, respectively, of the bracket 36.

Engaging gear wheels 130 and 131 mounted on shafts 132 and 133, respectively, that are journaled in bearings in the frame structure 122, connect the gear wheel 121 to a gear wheel 135 that is mounted on a shaft 136. The shaft 136 is journaled in bearings 138 and 139, supported in the bracket 36, and carries a crown gear wheel 140 for engagement with a co-operating crown gear wheel 141 on a shaft 142. The shaft 142 is journaled, adjacent to one end, in the bracket 36, and, adjacent to its other end, in a bearing 143 that is mounted on the frame 54. A crown gear wheel 145 on the shaft 142 engages a crown gear wheel 146 on a shaft 147 that corresponds to the shaft 67 of the unit mechanism 14 in that it carries two worm screws 148 and 149 corresponding to the worm screws 68 and 96. Similar to the manner in which the worm screw 68 drives the integrating mechanism 15 through the gears 69, 70, etc., to the pinion 75, the worm screw 148 drives the integrating mechanism 11 through a gear wheel 151, a shaft 152, a pinion 153, a gear 154 a shaft 155, and a pinion 156, as shown in Fig. 2.

In the unit mechanism 10, there is no sleeve corresponding to the sleeve 82 of the unit mechanism 14 but there is, however, a sleeve 160 corresponding to the sleeve 90, except that the sleeve 160 is rigidly secured to a shaft 161 corresponding to the shaft 77. A member 164 is pivotally supported on the sleeve 160 by pins or trunnions 165 and is provided with a depending arm or portion 167. A link 168 is pivotally connected to the depending portions 167 and 91, by pins 169 and 170.

Motion is transmitted from the shaft 142 to the stylus 12 through the gear wheels 145 and 146, the shaft 147 the worm screw 149, a worm-wheel 172, a shaft 173, a reduction gear train 174, a gear wheel 176 on the sleeve 160, the member 164, depending portion 167 and the link 168.

The shaft 173 carries a worm screw 178 for engagement with a segmental gear member 179 that is mounted on a shaft 180 and is adapted to engage a pin 181 on the gear wheel 172.

The shaft 173 of the worm wheel 172 is journaled, at one end, and the shaft 180 is mounted, in a bracket 183 that is pivotally mounted, by a pin 184, to the bracket 54. An upwardly projecting portion 185 of the bracket 183 engages an adjustable screw 186 in a cross member 188 of the bracket 54. A spring 190 extending between a pin 191 on the bracket 54, and an upwardly projecting portion 192 of the bracket 54 normally holds the projection 183 against the adjusting screw 186, with the worm wheel 172 in engagement with the worm screw 149.

A longitudinally slidable rod 195 is supported, adjacent to one end, in the projection 192 of the bracket 183 and, adjacent to its other end, in a stationary member 193 that projects from the frame structure of the integrating mechanism 11. A helical spring 196 surrounds the rod 195 between the projection 192 and a collar 197 fixed in position on the rod 195. A longitudinal push member or head 199 is longitudinally adjustably screw-threaded in position on the rod 195 and adapted to be locked in adjusted position by a nut 200.

A second longitudinally slidable rod 201, in axial alinement with the rod 195, is supported, adjacent to one end, in the bracket 36, and, adjacent to its other end, in a stationary member 202 that projects from the frame structure of the integrating mechanism 15. A longitudinal push member or head 204 is longitudinally adjustably screw-threaded in position on the rod 201 and adapted to be locked in adjusted position by a nut 205. The rod 201 extends loosely through the bracket 108 and is provided with means, such as a fixed collar 206, for engagement with the bracket 108.

As shown in Fig. 1, the push member 204 is adapted for engagement by a laterally projecting portion 207 on the rod 34, which, as hereinbefore pointed out, is adapted to be longitudinally moved periodically by the clock mechanism 7.

In operation, the disks 47 and 48, being rotated by the meter shafts 17 and 18, respectively, in accordance with the reactive-volt ampere hours measured by the meter 2 and with the watt hours measured by the meter 3, transmit their movements to the ball 50. For facility of further explanation, we may consider the operation of the device at unity power factor. Since there would be no movement of the meter shaft 17, and, consequently, no movement of the disk 47, the watt-hour meter shaft 18 and the disk 48 would then be rotating in proportion to the volt-ampere-hours, and the ball 50 would function as an ordinary gear wheel rotating about a fixed axis which, in this instance, lies along a line through the point of contact between the disk 47 and the ball 50 and the center of the ball. Under these conditions, the frame 122, carrying the disk 51 and the pointer 113, is adapted to be in the position shown in Fig. 2, with the pointer 113 at the mid point of the scale 115. Also, under these conditions, movement of the ball 50 is transmitted to the shaft 142, through the gear wheels 121, 131 and 130, the shaft 136 and the gear wheels 140 and 141.

Under ordinary commercial-circuit conditions, however, the power factor is not ordinarily unity and, as a result, the disks 47 and 48 operate in the same, or in opposite, directions, depending upon whether the power factor is leading or lagging. In either case, since the disks 47 and 48 rotate at different rates of speed, the difference being proportional to the power factors, the ball 50 and its axis of rotation will be shifted. This shifting of the ball occurs in a direction transverse to the plane of rotation of the disk 51 which, by reason of the mounting of the frame 122 on the trunnions 124 and 125, is moved transversely. The frame 122, being thus moved, carries the pointer along the scale member 115 a distance in one direction or the other from the center thereof to indicate both the value of the power factor and whether it is leading or lagging. During the shifting movement of the frame 122, which carries the shaft 132 of the gear wheel 130 with it, the latter rolls for a distance about the perimeter of the gear wheel 135, while continuing to rotate the latter in accordance with the rotation of the disk 51.

The shifting of the disk 51 from one side of its unity power-factor position to the other also compensates for the change in relative direction of rotation of the disks 47 and 48 to rotate the disk 51 in direct proportion to volt-ampere-hours, irrespective of leading or lagging power-factor, so that, at all times, the disk 51 and the shaft 142 are directly connected to the reactive volt-ampere-hour meter 2.

The description of parts, their relation to each other and of the operation thereof has so far shown how the integrating mechanism 15 is at all times directly connected to the watt-hour meter shaft 18, how the translating device 5 operates to rotate the shaft 142 in accordance with volt-ampere hours, how the integrating mechanism 11 is, at all times, directly connected to the shaft 142; and how the pointer 113 operates to indicate the value and direction of power factor.

It remains to show, how the single recording member or stylus 12 is operated from the shafts 18 and 142 to effect a record on the chart 31, indicating the periodic integrated demands of both volt-amperes and watts.

In the initial or zero position of the stylus 12, which is at the left side of the chart 31, as viewed in the drawings, the segmental gears 105 and 179 are in proximity to the gears 97 and 172 in the paths of travel of the pins 106 and 181, respectively. The parts had previously been moved or reset to these positions, as will be described.

Since the shafts 18 and 142 are continuously rotating, in service, the parts in the above mentioned reset positions will, when they reach these positions, begin to move away therefrom. Also, since the volt-amperes of a circuit are always greater than the watts, the shaft 142 will move at a greater speed than the shaft 18.

Movement is transmitted from the shaft 142 through the gear wheels 145 and 146, the shaft 147 and the worm screw 149, to move the gear wheel 172 in counterclockwise direction, as viewed in Fig. 2. This movement moves the pin 181 away from the segmental gear member 179, and, through the worm screw 178 on the shaft 173, moves the gear member away from the path of travel of the pin 181. At the same time, the depending arm or portion 167, on the sleeve 160, is moved, through the shaft 173, the gear train 174 and the gear wheel 176 to the right, as viewed in Figs. 1 and 2. This movement of the arm 167 is transmitted, through the link 168 to the stylus 12, and, since the latter is rigidly mounted on the shaft 77 which is movable relative to the sleeve 90, the stylus will be moved independently and in advance of the pin 92.

Simultaneously with the above described movements, beginning with the initial movement of the stylus 12, the gear wheel 97 is also moved counter-clockwise by the shaft 18, through the gear wheel 66, the shaft 67 and the worm screw 96. This movement moves the pin 106 away from the segmental gear member 105 and moves the latter out of the path of travel of the pin 106. Movement is also transmitted by the shaft 98, through the gear train 99 and the gear wheel 100, to the sleeve 90 which, in turn, transmits its movement to the pin 92.

The stylus 12 and the pin 92 are thus moving in the same direction at different rates of speed, corresponding to the volt-ampere hours and the watt-hours, respectively measured by the meters 2 and 3.

At the end of a predetermined time interval, such as fifteen minutes, during which the stylus 12 is inscribing a record curve similar to the curves 209 on the chart 31, the chart is started on an advance movement equal to the distance between the curves 209 and the rod 34 is actuated by the clock mechanism 7. The chart is started on this movement an instant before the stylus starts on its return movement so that a mark is made at the end of the stylus forward movement similar to marks 208 on the lines 209.

The relation of the spring 196 to the bracket 183 and the relation of the collar 206 to the bracket 108 are such, as adjusted by the push members 199 and 204, that, when the rods 195 and 201 are moved longitudinally by the rod 34, the bracket 183 will be moved about its pivot pin 184 against the action of the spring 190 in advance of movement of the bracket 108 about its pivot pin 109 against the action of the spring 116.

When the bracket 183 is thus moved about its pivot pin 184, the gear wheel 172 becomes disengaged from the worm screw 149. Being thus, disengaged from its actuating mechanism, the stylus 12 starts on its return movement to its zero position but, since the corresponding disengagement of the gear wheel 97 from the worm screw 96 has not yet occurred, the projection 87 engages the pin 92 to arrest the movement of the stylus. Since, at this instant, the chart 31 is at an intermediate position of the above-mentioned advance movement, the stylus is caused to inscribe a mark similar to marks 210 that are on points on the curves 209 corresponding to the position of the pin 92. Thus, the curves 209 represent the volt-ampere-hour demands for predetermined periods, and the marks 210 represent the watt-hour demands for the same periods.

An instant after the projection 87 engages the pin 92, the collar 206 engages the bracket 108 to move the latter about its pivot pin 109 and this movement disengages the gear wheel 97 from the worm screw 96.

The bracket 183, having been, a short interval previous to this action, moved about its pivot pin 174 to disengage the gear-wheel 172 from the worm screw 149, both the stylus 12 and the pin 92 are free to return to their zero positions. This return movement is caused by gravity on the weights of the link 168, the stylus 12, the balance weights 88, etc., the movement being transmitted in the unit mechanism 14 by the projection 87 to the pin 92, to the sleeve 90, to the gear wheel 100, to the gear train 99 and to the shaft 98 and, in the unit mechanism 10, by the arm 167 to the sleeve 160, and the gear wheels 174, 175 and 176 to the shaft 173.

Movement of the shaft 98 is transmitted directly to the gear wheel 97 to move the latter in the clockwise direction, as viewed in Fig. 2, and, through the worm screw 104, to the segmental gear member 105 which moves to a position in which it intercepts and stops the pin 106 on the wheel 97.

Similarly, movement of the shaft 173 is transmitted directly to the gear wheel 172 to move the latter in the clockwise direction, as viewed in Fig. 2, and, through the worm screw 178, to the segmental gear member 179 which moves to a position in which it intercepts and stops the pin 181 on the wheel 172.

The above actions are repeated during periodic intervals to record the curves 209, each of which may be considered a single curve representing watt-hour demand up to its corresponding mark 210, a single curve representing volt-ampere-hour demand up to its outer right-hand end, as viewed in Fig. 1, or a composite curve which represents both the watt-hour and the volt-ampere hour demands. As a corollary, the position of the stylus, at any instant during the inscription of one of the curves 209, indicates the instantaneous value of the integrated volt-ampere demand from the beginning of one period and, at the instant the projection 87 impacts with the pin 92, the position of the stylus indicates the integrated watt demand at the end of the same period. Thus, a single means is provided for both indicating and recording a plurality of quantities.

By my invention, the employment of standard meters, that are simple and effective in operation, is permitted, in conjunction with a relatively simple mechanism for obtaining, in a simple and effective manner, all of the information desired for the efficient operation of an alternating-current system and for basing equitable tariff rates.

While I have shown and described a particular form of my invention, changes may be effected therein without departing from the spirit and scope thereof, as set forth in the appended claims.

I claim as my invention:

1. A measuring instrument comprising a plurality of actuating means responsive to different quantities, translating means operated by said means, and an indicating member periodically affected by said translating means and one of said actuating means.

2. A measuring instrument comprising a plurality of means responsive to different quantities, an indicating member the position of which is effected by, and depends entirely upon, the operation of one of said means and means for periodically affecting the indicating member in accordance with the operation of another of said responsive means.

3. A measuring instrument comprising a plurality of means responsive to different quantities, an indicating member the position of which is effected by, and depends entirely upon, the operation of one of said means, and means for periodically interrupting said operative connection for resetting the indicating member and affecting the same in accordance with the operation of another of said responsive means during the interruption of said connection.

4. A measuring instrument comprising means responsive to a plurality of different quantities, an indicating member normally operated thereby to indicate values of another quantity, and means for resetting the indicating member to an initial position and causing the same to indicate a value of one of said first quantities during its return movement to said initial position.

5. A measuring instrument comprising a movable indicating member, a second member movable in the path thereof, means for moving the indicating member in advance of said second member, and means for resetting said indicating member to an initial position and causing it to operatively engage said second member during movement to said position.

6. A measuring instrument comprising a stylus for inscribing a record of one quantity on a record chart and means for causing the stylus to inscribe a value of another quantity at an intermediate position on said first record after recording said first quantity.

7. A measuring instrument comprising a stylus for inscribing an uninterrupted line representative of one quantity on a record chart and means for actuating the stylus to effect a mark representing a value of another quantity laterally to said line at an intermediate point thereon.

8. A measuring instrument comprising a stylus for inscribing a curve representative of one quantity on a record chart and means for actuating the stylus to effect a mark representing a value of another quantity laterally to said line at an intermediate point thereon during the return movement of the stylus.

9. An electrical measuring instrument for an alternating-current circuit comprising a plurality of meters severally responsive to one of the components of the apparent power of the circuit, a translating device operated by said meters in accordance with the apparent power of the circuit, means operable by said translating device and one of said meters for coaction with movable record chart means, and means for disconnecting the recording means from said translating device and from said meter in predetermined time relation.

10. An electrical measuring instrument for an alternating-current circuit comprising a plurality of meters severally responsive to one of the components of the apparent power of the circuit, a translating device operated by said meters in accordance with the apparent power of the circuit, an element actuated by said translating device, a second movable element actuated by one of said meters and adapted to cause a recording element to effect a record, and resetting means for disconnecting said recording element from said translating device and subsequently disconnecting said second movable element from its actuating meter.

11. A measuring instrument comprising a movable indicating element, a plurality of means responsive to different quantities for actuating said element in accordance with one quantity and means for resetting said actuating means in predetermined sequence.

12. A measuring instrument comprising a movable recording element and a plurality of means for causing said element to record a single uninterrupted line marked to represent different quantities in predetermined sequence.

13. A measuring instrument comprising a movable indicating element, means for actuating the same in accordance with values of one quantity, and means movable in pursuit of said element in one direction, in accordance with values of another quantity and adapted for co-operation with said element when the latter moves in reverse direction.

14. A measuring instrument comprising a movable recording element, means for moving the same in one direction to effect a record in accordance with values of one quantity and means movable in pursuit of said element in accordance with values of another quantity and co-operating with the recording element to effect a record adjacent to said first record when the recording element moves in reverse direction.

15. In a measuring instrument for an alternating-current circuit, the combination with a watt-hour meter and a reactive-voltampere-hour meter, of means comprising a translating device actuated by the meters in accordance with the volt-ampere-hours of the circuit, an indicating member actuated by the meters in accordance with the power factor of the circuit and a reference element cooperating with said indicating member.

16. A measuring instrument for an alternating current circuit comprising a reactive-volt-ampere-hour meter, a watt-hour meter, a translating device operatively connected to said meters at all times to be actuated in accordance with the volt-ampere-hours of the circuit, a stationary scale and a pointer actuated by said meters in accordance with the power-factor of the circuit.

17. A measuring instrument for an alternating current circuit comprising a meter including a movable element actuated in accordance with the reactive-volt-ampere-hours of the circuit, a meter including a movable element actuated in accordance with the watt-hours of the circuit, a translating device including a movable element operatively connected to said meters at all times to be actuated in accordance with the volt-ampere-hours of the circuit, and a demand indicating member operatively connected to one of said movable elements.

18. A measuring instrument for an alternating-current circuit comprising a meter including a movable element actuated in accordance with the reactive-volt-ampere-hours of the circuit, a meter including a movable element actuated in accordance with the watt-hours of the circuit, a translating device including a movable element operatively connected to said meters at all times to be actuated in accordance with the volt-ampere-hours of the circuit, and an indicating element operatively connected to one of said movable elements.

19. In a measuring instrument for an alternating-current circuit comprising a reactive-volt-ampere hour meter, a watt-hour meter, a translating device operatively connected at all times to each of said meters to be actuated in accordance with the volt-ampere-hours of the circuit, an integrating mechanism connected to one of said meters, a member operated by the other of said meters, a member operated by said translating mechanism and a second integrating mechanism operated by one of said members.

20. A measuring instrument for an alternating-current circuit comprising a reactive-volt-ampere-hour meter, a watt-hour meter, a translating device operatively connected at all times to each of said meters to be actuated in accordance with the volt-amper-hours of the circuit, an integrating mechanism connected to the watt-hour meter and a second integrating mechanism connected to the translating device.

21. An instrument comprising a pair of meters each including a pivoted element movable in accordance with a quantity measured by the meter, an indicating member mounted to loosely pivot about the pivot axis of one of said elements and to engage the latter when returning to an initial position, means connecting the other element to said indicating member to move the latter in advance of the first element, and means for disconnecting said other element from its meter to return said other element to said initial position and for disconnecting said first element from its meter after engagement of the indicating member with said first element.

22. A measuring instrument for an alternating-current circuit comprising a reactive-volt-ampere-hour meter, a watt-hour meter, a translating device operatively connected to said meters at all times to be actuated in accordance with the volt-ampere hours of the circuit, recording member actuated by said translating device and means for periodically resetting said recording member to a position controlled by one of said meters.

23. An alternating-current electrical measuring instrument comprising recording means for cooperation with a chart, and volt-ampere and watt-responsive elements for actuating said means to record a line positively responsive to said volt-ampere element throughout its length and to effect a record of actuation of the watt-responsive element in position comparable to said line.

24. A measuring instrument comprising recording means for co-operation with a chart, and quantity-responsive elements for actuating said means to record a line positively responsive to one of said elements throughout its length and to effect a record of actuation of another of said elements in position comparable to said line between the extremities thereof.

25. A measuring instrument comprising a recording element co-operating with a chart to record a line thereon representing a quantity, and means for actuating said element in accordance with said quantity between spaced points on said line and for effecting the line between said points to record another quantity.

26. The combination with a plurality of rotatable members, an indicating element and means connected between said members and said element and operated by the members for causing the element to give a direct indication at all times of the relative speeds of said members irrespective of changes in said speeds.

27. A measuring instrument comprising a movable indicating element and means for moving the element a distance corresponding to the value of one quantity, and means for then moving the element transversely to the path of the first movement at a point corresponding to the value of another quantity.

28. A measuring instrument for measuring two related vectorial quantities comprising means for measuring each quantity, a single indicating element, and means for subjecting the single element to the control of the measuring means to indicate each quantity separately.

29. In a measuring device, the combination with a plurality of measuring elements and a single recording element, of means for operatively connecting the single recording element to each of the measuring elements to render said recording element responsive to the individual or conjoint action of the measuring elements.

In testimony whereof, I have hereunto subscribed my name this 4th day of December, 1923.

BENJAMIN H. SMITH.